United States Patent [19]

Forsberg

[11] 3,910,304
[45] Oct. 7, 1975

[54] COMPRESSED AIR SPRAY APPARATUS
[75] Inventor: John R. Forsberg, Arlington Heights, Ill.
[73] Assignee: Helene Curtis Industries, Inc., Chicago, Ill.
[22] Filed: Jan. 13, 1975
[21] Appl. No.: 540,532

Related U.S. Application Data

[62] Division of Ser. No. 334,001, Feb. 20, 1973, abandoned, which is a division of Ser. No. 196,623, Nov. 8, 1971, Pat. No. 3,752,404.

[52] U.S. Cl. .................... 137/209; 251/9; 215/355; 222/400.7
[51] Int. Cl.[2] .................... B05B 15/00; F16L 55/14
[58] Field of Search .......... 251/9, 10, 4; 222/400.7; 215/355; 137/209, 377

[56] References Cited

UNITED STATES PATENTS

| | | | |
|---|---|---|---|
| 2,806,482 | 9/1957 | Norris | 251/9 X |
| 3,604,602 | 9/1971 | Lee | 222/400.7 |
| 3,747,809 | 7/1973 | Harvey | 251/9 X |

FOREIGN PATENTS OR APPLICATIONS

| | | | |
|---|---|---|---|
| 1,158,278 | 7/1969 | United Kingdom | 251/355 |

Primary Examiner—Alan Cohan

[57] ABSTRACT

A hair spray system employing air under pressure to propel and atomize hair spray liquid comprises a constant pressure compressor, a liquid reservoir supplied with air from the compressor and in turn supplying air and liquid to a spray gun. Multiple reservoir and guns can be connected to one compressor. The gun includes a mixing chamber floating between spring biased valves at the chamber ends with an intermediate air inlet and an end liquid inlet, the forward spring being weaker. The gun trigger pushes the rear valve thereby causing the weaker forward spring to first open and start the air flow through the forward valve, after which the rear valve opens and liquid flow starts. On cut off, the liquid flow stops before the air flow stops. An adjustable stop controls the trigger movement to vary the ratio of liquid flow to air.

The compressor is housed in an air filter housing, and the reservoir for hair spray liquid is located in a housing with an arrangement to pinch the air hose to stop flow when the housing for the reservoir is opened. The liquid reservoir includes a novel arrangement for connecting the compressor and spray gun to a replacement reservoir unit.

7 Claims, 21 Drawing Figures

COMPRESSED AIR SPRAY APPARATUS

This is a division of application Ser. No. 334,001, filed Feb. 20, 1973, now abandoned, which is in turn a division of appreciation Ser. No. 196,623, filed Nov. 8, 1971, now U.S. Pat. No. 3,752,404, issued Aug. 14, 1973.

This invention relates to hair spray systems for use in beauty salons which eliminates the use of so called aerosol spray cans, with resulting pollution of the air by discharge of propellant gases. The invention utilizes air under pressure as the propellant.

SUMMARY OF THE INVENTION

The invention comprises a motor operated compressor and control mechanism therefor of conventional type mounted within a filter housing so that filtered air is supplied to the compressor and for cooling the motor. The use of filtered cooling air avoids dust build up in the motor, and the location of parts in the filter housing provides a compact, trouble free arrangement. A water separator is not needed because water in the compressed air mingles with the aqueous hair spray liquid.

The hair spray liquid is supplied in a replaceable flask closed by a sealing plug which is not readily removable. The plug is held against turning by cooperating projections in the flask and slots in the plug, and removal of the plug is prevented by interlocking ribs and grooves. The plug is sealed by a gasket and an adapter head having the hoses for air and liquid connected thereto fits the plug and permits ready disconnection to allow replacement of the depleted reservoir flask by a filled flask. In such replacement the opening of the housing for the reservoir flask shuts off the air supply thereto.

The spray gun provides a mixing chamber with spring biased valves at the ends, and the mixing chamber floats between the springs of the values, with a fixed abutment at one end and the gun trigger operator at the other end. The liquid supply connects through the rear valve and the air supply connects to the mixing chamber intermediate the valves. The front valve spring is weaker so as to allow the front valve to open before the rear valve, thus allowing air flow to precede liquid flow. In closing, the rear valve closes first thus allowing air flow to purge the mechanism of liquid. The spray orifice member is removable and can be replaced should it become worn or clogged.

The ratio of liquid flow to the air flow is regulated by an adjustable stop mechanism to vary the maximum openings of the rear liquid flow control valve to produce a heavy or light spray.

BRIEF DESCRIPTION OF DRAWING

The invention is described in greater detail in connection with the accompanying drawing showing a preferred embodiment of the invention by way of example, and wherein.

Figure 1:
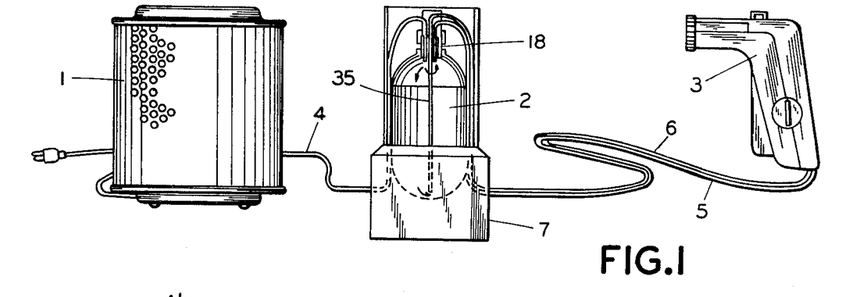
FIG. 1 shows an installation, partly diagramatic, using a single spray gun and reservoir connected to a compressor.

Referring to the drawing, FIG. 1, there is shown an installation comprising an air compressor unit 1, a liquid reservoir 2 in the form of a flask, a spray gun 3, and conduits for transmitting air and liquid under pressure to the spary gun. The conduit 4 conducts compressed air from the air compressor to the reservoir flask 2, and conduits 5 and 6 conduit air and liquid respectively under pressure to the spray gun from the reservoir. The flow of air and liquid and mixing thereof to provide a spray is controlled by the spray gun, and the control and mixing mechanism thereof will be described later. The reservoir flask 2 is located within a housing 7 that will be described hereinafter.

Figures 2, 3, 4, 5:
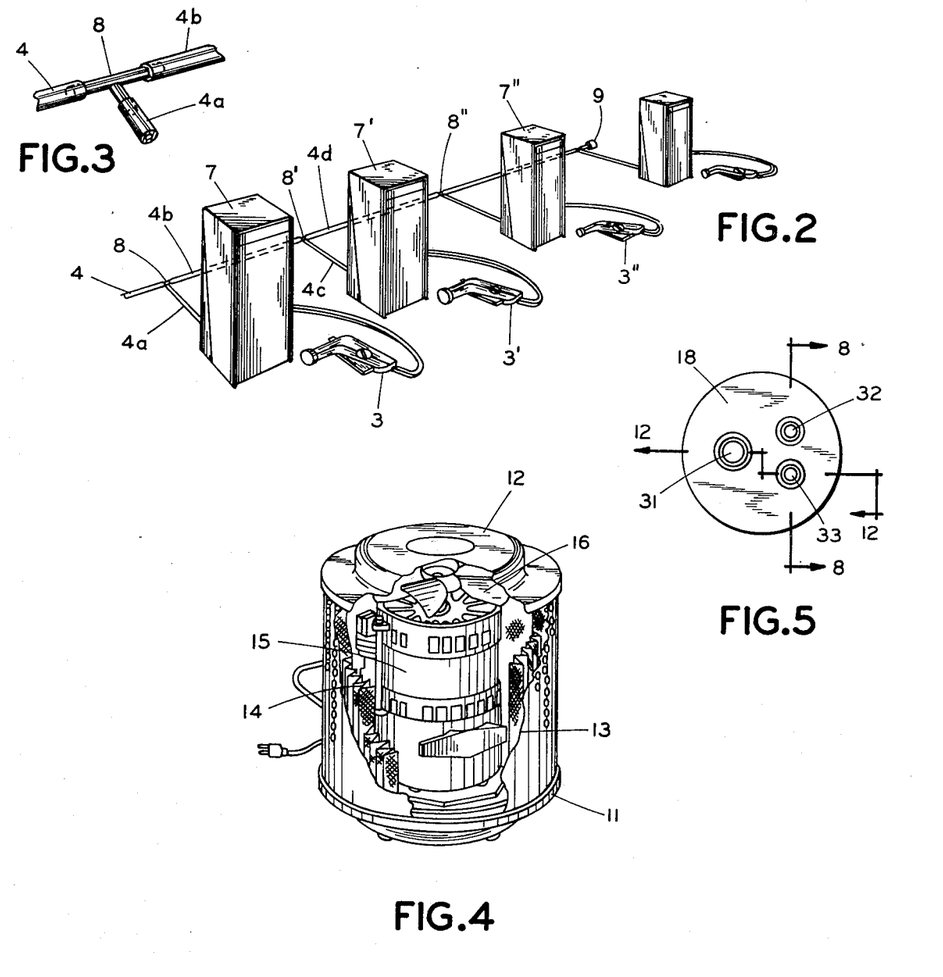
FIG. 2 shows multiple reservoirs and spray guns supplied from a single compressor.
FIG. 3 shows a detail of the conduit connections on an enlarged scale.
FIG. 4 shows a perspective view of a compressor unit with parts broken away.
FIG. 5 is a plan view of the plug for the reservoir flask.

In FIG. 2 is shown an arrangement whereby a single compressor supplies air under pressure from conduit 4 to a plurality of liquid reservoirs located in housings 7, 7', 7'', etc and spray guns 3, 3',3'', etc. are respectively connected to the reservoirs as described in connection with FIG. 1. In this arrangement the conduit 4 from the compressor has a tee connected 8 (shown on an enlarged scale in FIG. 3), and one branch has a conduit 4a connected to the reservoir in housing 7. The other branch of the tee has a conduit 4b connected to a similar tee 8' and one branch of the latter tee has a conduit 4c connected to the reservoir in housing 7' and the other branch has a conduit 4d connected to tee 8''. Thus it will be seen that by provision of a simple arrangement of flexible conduits providing a friction fit connection to the tees, any desired number of reservoirs and spray guns may be operated from a single compressor. The last tee can be closed by a suitable friction cap 9, which is easily removed to permit attachment of another conduit, tee and reservoir and gun.

The compressor unit illustrated in FIG. 4 comprises a flanged saucer like base 11 and a flanged top plate 12 which engage a perforate cylindrical wall 13 to form a housing, and a cylindrical filter 14 of suitable construction is positioned in the housing. The filter illustrated is of pleated porous paper of known type formed into a cylinder and is suitably sealed in the housing at its top and bottom. Within the filter 14 is a combined electric motor, compressor and limit control mechanism of known construction indicated generally by numeral 15. The intake of the compressor is within the filter 14 so that the air supplied to the compressor as well as the cooling air supplied by fan 16 to the electric drive motor must pass through the filter. The control mechanism may be of the known type of pressure operated control mechanism which maintains the motor and compressor in continuous operation but opens a bypass when the pressure reaches a predetermined value, thereby insuring a constant pressure air supply to the liquid reservoirs. The arrangement of the driving motor, compressor and controls within the air filter housing as above described is considered to be a novel feature of this invention.

As shown in detail in FIGS. 1 and 5 to 10, the reservoir 2 is in the form of a flask or bottle provided with a neck 17, (FIG. 9) having an opening therein, and a plug 18 of plastic material is received in said opening with a loose fit. The flask may be made of suitable plastic, such as polyethylene, and the inner wall of the neck has the circumferential grooves 19, 20 therein, and bosses 21 and 22 adjacent to the bottom of the neck. The plug 18 is provided with longitudinal diametrically opposed slots 23 (FIGS. 8, 12) adapted to receive the bosses 21, 22 when the plug is pushed into the neck opening. The cooperation of the bosses and slots prevents turning of the plug. In such position the grooves 19, 20 receive the annular ribs 25, 26 on the plug walls so that the plug is locked against removal and also against turning. The chamfer 27 on the lower edges of ribs 25, 26 allows the ribs to deform enough to be forced into the neck to enter grooves 19, 20. However, the blunt edges on the upper sides of the ribs prevent them being easily forced out of the grooves and thus makes removal of the plug difficult. The plug wall may be relieved at 28 under flange 29 to receive a suitable ring gasket 30.

Figure 7:
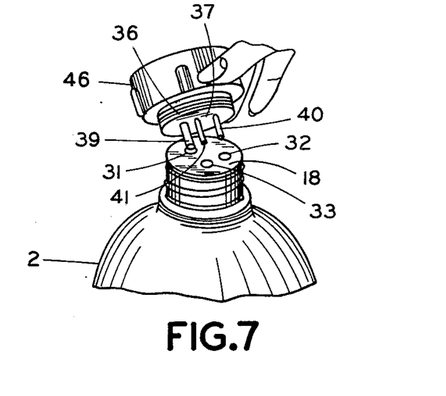
FIG. 7 is a perspective fragmentary view showing a step in connecting the reservoir flask to the compressor and spray gun.
Figures 8, 9:
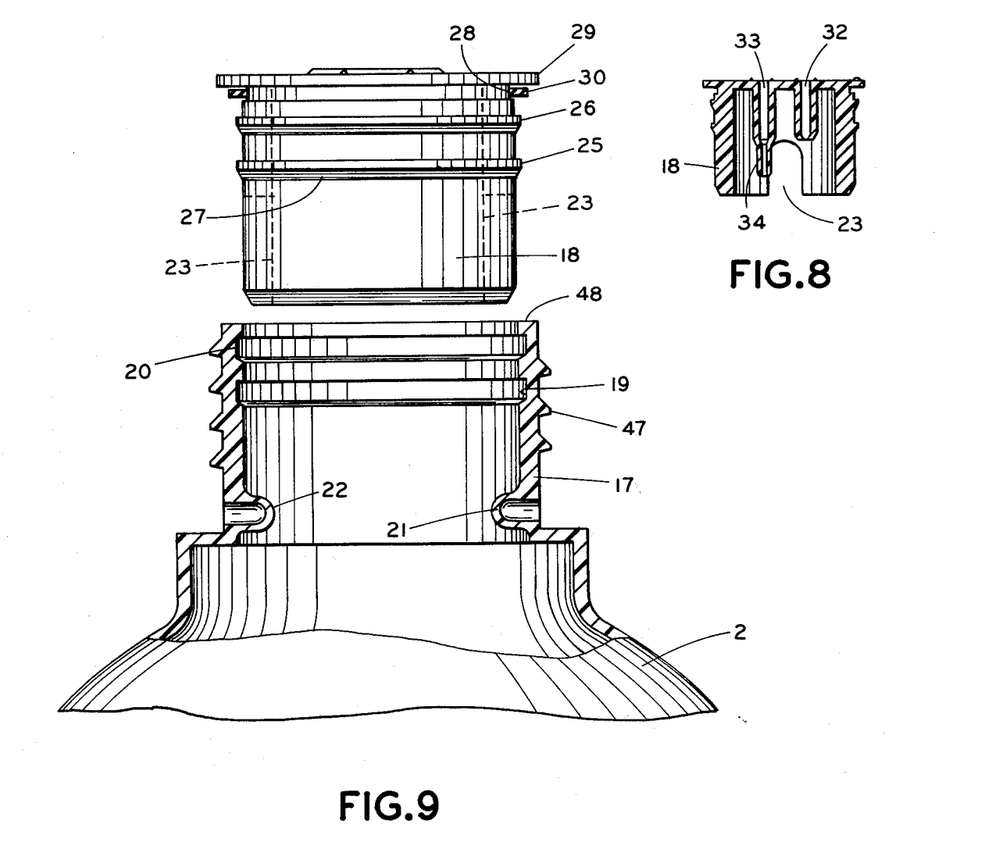
FIG. 8 is a section taken on line 8—8 of FIG. 5.
FIG. 9 is a fragmentary elevation of the reservoir flask and plug.
Figures 12, 13:
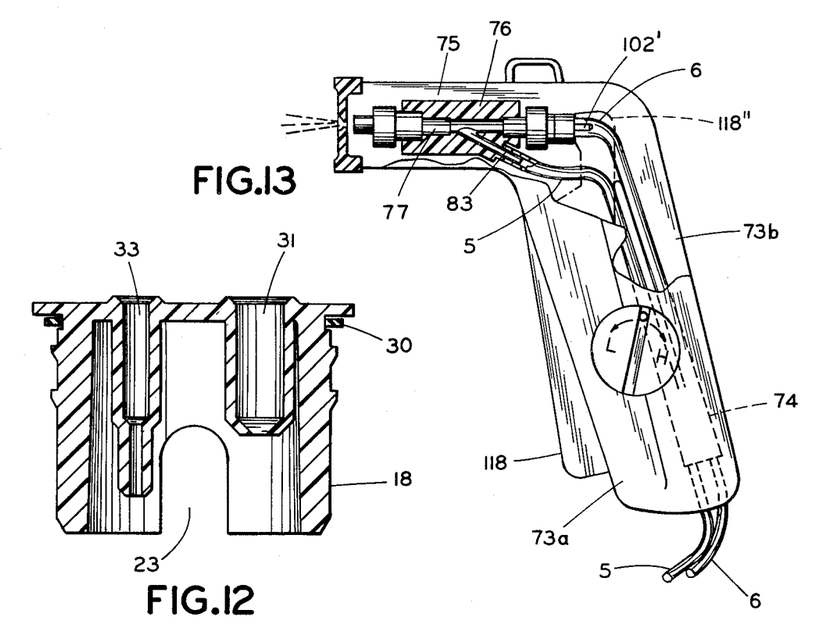
FIG. 12 is a section taken on line 12—12 of FIG. 5.
FIG. 13 is a partly diagramatic broken away view of the spray gun.
Figure 14:
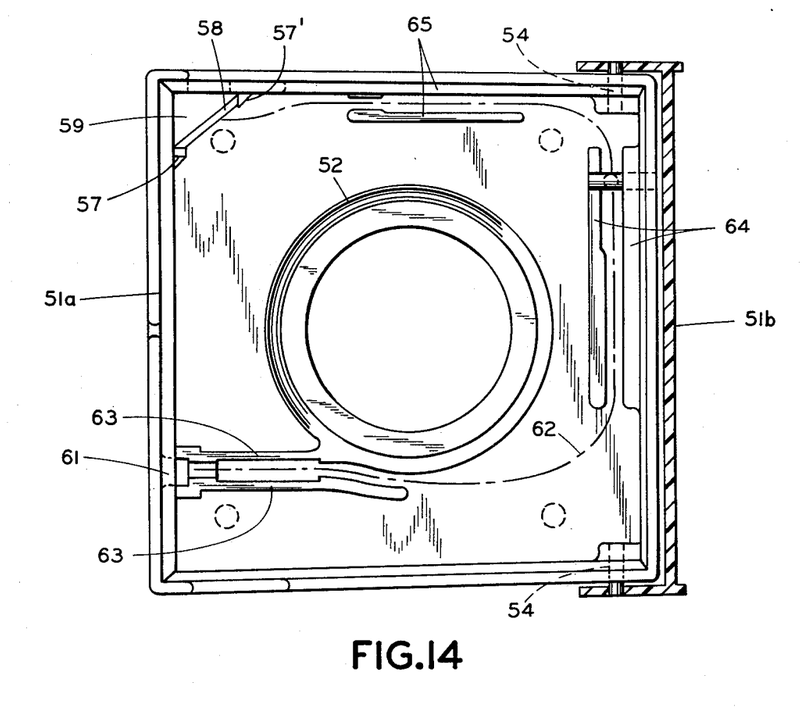
FIG. 14 is a plan view of the housing for the reservoir flask, the cover being in section.

As shown in FIGS. 5, 7, 8 and 12, the plug 18 has three apertures 31, 32 and 33 in the top wall, each being surrounded by a raised portion on the upper surface of the plug, and by a well extending into the plug. (FIGS. 8 and 12.) Aperture 31 is for the air supply and is somewhat larger than apertures 32 and 33, which may be of equal diameter. The well for aperture 33 has a nipple portion 34 at its lower end which receives a tube 35 (FIG. 1) extending to adjacent the bottom of the flask. The plug receives a coupling head 36 (FIGS. 7, 10 and 11) provided with a flat lower face 37 and a reduced diameter 38 on its upper surface. The three passages through the coupling head are surrounded by integral sleeves 39, 40 and 41 extending from the bottom which are received within the openings 31, 32 and 33 respectively of the plug 18. Sleeve 39 fits into larger opening 31 so the coupling head cannot be attached incorrectly. A flanged hollow cap 45 fits over the reduced diameter portion 38 of the adapter head, and a loose internally flanged coupling nut 46 receives the combined coupling head-cap unit. Corresponding sleeves 42, 43 and 44 are adapted to receive flexible conduits with a leak proof fit, these conduits passing through aperture 45a in the cap 45. Air conduit 4 from the compressor is connected to sleeve 42, air conduit 5 to the spray gun is connected to sleeve 43, and liquid conduit 6 to the spray gun is connected to sleeve 44.

Figures 10, 11, 15:
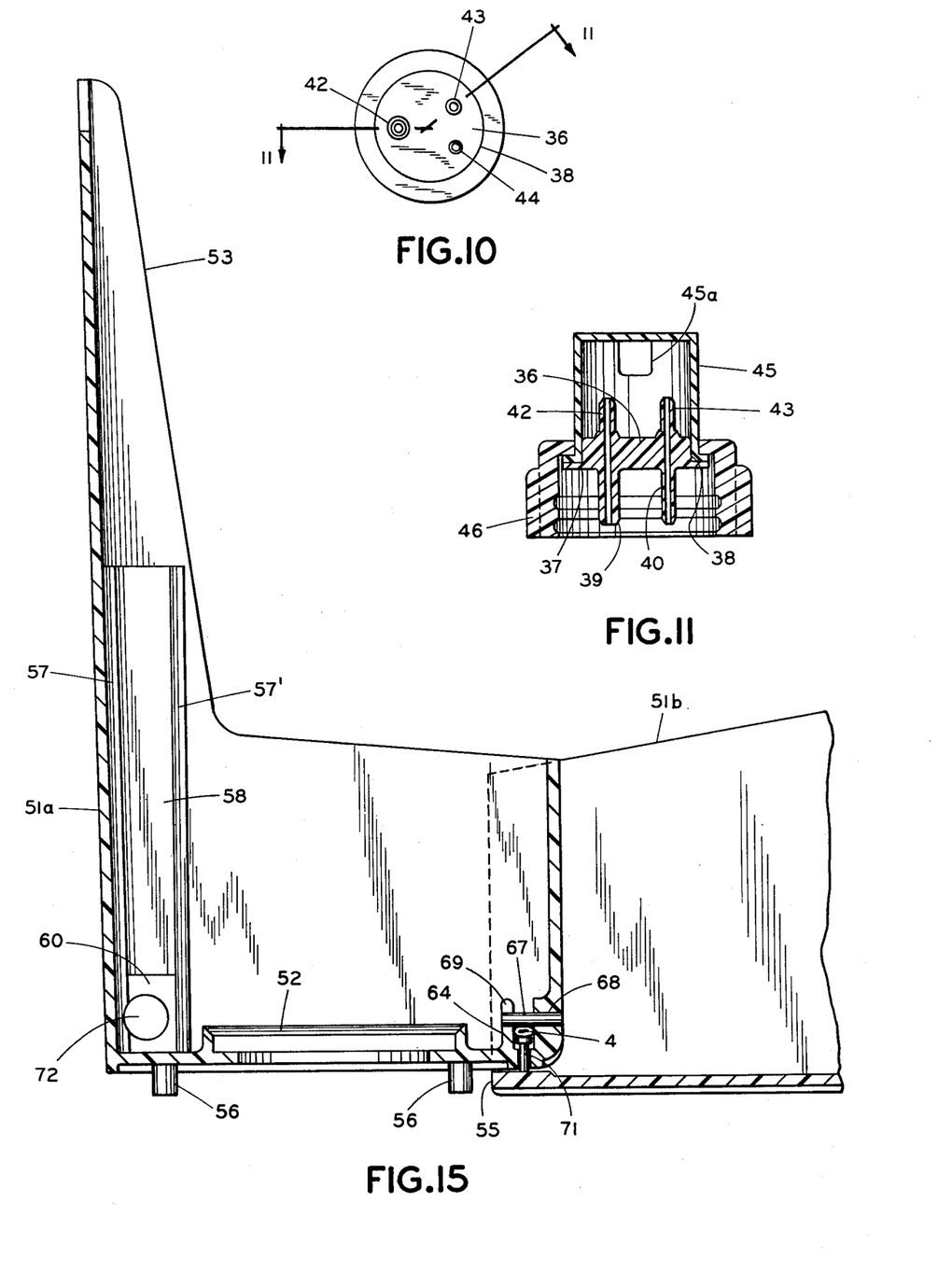
FIG. 10 is a plan view of the adapter head.
FIG. 11 is a sectional view of the adapter head, cap and nut assembly.
FIG. 15 is a vertical sectional view of the reservoir housing with the cover in open position.

To assemble the device, the nut 46 is moved upwardly along cap 45 to the position shown in FIG. 7, and the sleeves 39, 40 and 41 are aligned with openings 31, 32, 33, respectively and the head then is pushed down with its face 37 against the top of plug 18, a suitable soft sealing gasket being interposed therebetween. The exterior of the neck of flask 2 is threaded at 47 (FIG. 9) to fit the threads in nut 46. (FIG. 11). Upon screwing down the nut, the coupling head 36 and plug 18 are drawn down, causing the flange 29 and interposed ring gasket 30 to seat against the top face 48 of the neck, and causing the lower face 37 of the coupling head and the interposed gasket to seat against the top surface of the plug 18. Thus the plug and sleeves 39, 40 and 41 are sealed against leakage from the flask to the exterior. It will be seen that air which enters the flask through opening 31 builds up pressure in the flask and the air bypasses over the surface of the liquid to supply air through opening 32 to the spray gun. The air pressure in the flask forces liquid through tube 35 and passage 33 to conduit 6, and thus, both liquid and air under pressure are supplied to the spray gun.

When the liquid in the flask is depleted it is possible to replace the empty flask by unscrewing the nut 46 to allow removal of the coupling head 36, which is then attached to a replacement full flask as above described. This provides a convenient arrangement and saves the time that would be required to remove the plug and connected conduits and refill the empty flask, and avoids spillage.

The housing 7 for the flask 2 now will be described. Referring to FIGS. 2, 6, 14 and 15, the reservoir housing 7 is made up of two parts 51a and 51b, the latter being designated as a cover. The housing provides an annular raised seat 52 adapted to receive the round bottom flask 2, and has cut away sides 53 to allow the flask to be easily grasped for inserting or changing flasks. The open front is closed by the three sided cover 51b, this cover being hinged on pins 54 passing through the side walls of the housing and cover. These hinge pins are so located with respect to the bottom edge 55 of the cover and the bottom of the housing 51a that when the cover is moved to open position the edge 55 of the face of the cover comes under the housing 51a as shown in FIG. 15, the legs 56 on the housing providing the necessary clearance between the supporting surface (a table or the like) on which the housing stands in operation and the bottom of the housing. The purpose of this will be explained shortly.

The housing 51a has cleats 57, 57' at one corner, and a panel 58 held in place thereby, provides a chamber 59 having a lower opening 60. The conduit 4 leading from the compressor enters housing 51a through an opening 61 at the bottom, and as shown by the broken line 62, the conduit passes through guides 63, 64 and 65 and enters chamber 59 through opening 60, and passes upwardly in chamber 59, and then connects to the reservoir flask 2. A pin 67 is received in an aperture 68 in the housing and enters a guide slot 69 in the one guide 64. As seen in FIG. 15, the air hose or conduit 4 between guides 64 passes under pin 67. When the housing cover is hinged to open position, as for example, to change reservoir flasks, the bottom end 55 pivots under the housing 51a and engages a headed pin 71, forcing this pin upward to compress conduit 4 between it and the cross pin 67, thus shutting off flow through the conduit 4. The adapter head 35 then can be removed, the air trapped in the flask being bled out as the adapter head is released, and the flask may be exchanged for a full one as previously described. This arrangement allows each reservoir flask to be replaced independently of other flasks connected to the compressor without bleeding off air which would render inoperative the other spray guns in the system.

Figure 6:
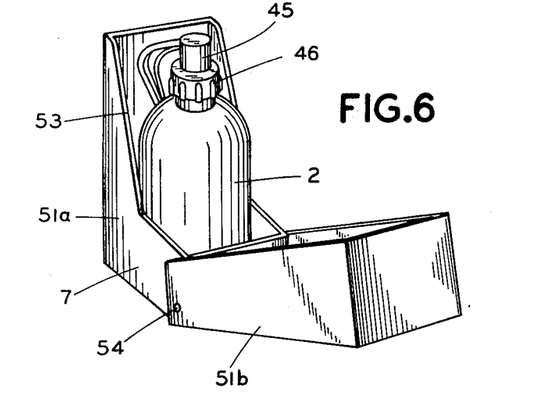
FIG. 6 is a perspective view of the reservoir housing and flask, the housing cover being in open position.

Referring to FIGS. 1, 6 and 13, the conduits 5 and 6 pass from the flask down through chamber 59 and exit through hole 72 (FIG. 15) and pass on to the spray gun 3. The spray gun is composed of two halves 73a, 73b may be of suitable plastic material, the halves being joined together longitudinally, as by a suitable adhesive. Part 73b provides an internal groove 74 through which pass the air and liquid conduits 5, 6. In the barrel portion 75 of the gun is located the mixing chamber 76 (FIGS. 13 and 16) which comprises a cylindrical member having a mixing passageway 77 therethrough with a counterbore 78 at one end, and a relieved bore 79 and counterbore 81 at the other end. The member 76 may be made of suitable plastic material and has an angular passageway 82 in which is connected a nipple 83 and to which nipple the air conduit 5 may be attached as seen in FIG. 13. The forward counterbores 81, 79 receive a valve assembly indicated generally by the numeral 84. The rearward counterbore 79 receives a similar valve assembly 85. These valve assemblies are arranged to be operated by the gun trigger to open and close, and thereby control the flow of air and liquid into the mixing chamber, and they are arranged so that the forward valve 84 opens before rear valve 85 upon opening movement of the trigger, and upon release of the trigger the rear valve 85 closes before forward valve 84. This arrangement and the structure involved will now be described.

The forward valve 86 may be a modification of the structure of Abplanalp U.S. Pat. No. 2,818,202 comprises a two part housing which may be of a suitable plastic material and comprises a cylindrical cap member 86 and a stem housing 87. Cap 86 has a bore 88 with a top end 89 in which is a reduced bore 90, and there is an internal rib 91 in bore 88. (The term bore used herein refers to a circular cavity or aperture not necessarily produced by a boring operation.) The valve stem member comprises an enlarged guide body 92 providing a reduced section 93 providing a shoulder 94, a neck 95, a hollow stem 96, and a spring centering boss 97 at the lower end. A washer 98 of neoprene or other suitable rubbery or resilient pliable material is located around neck 95 with a snug fit. The stem housing 87 is received within the cap member 86 and is locked in assembly by an external rib or flange 101 retained by rib 91, and presses the washer adjacent the periphery against top end 89. The stem housing provides an abutment for one end of spring 102 which biases the valve stem upward so that portion 93 of the stem presses the center portion of washer 98 against the top 89. The stem housing 87 has an extension 102' and a passage 103 is provided in the stem housing.

Figure 18:
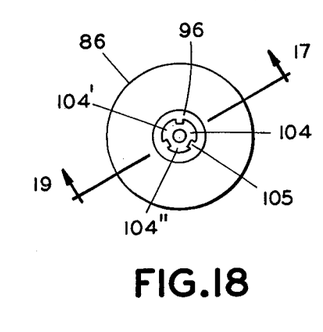
FIG. 18 is a plan view of FIG. 17.
Figure 19:
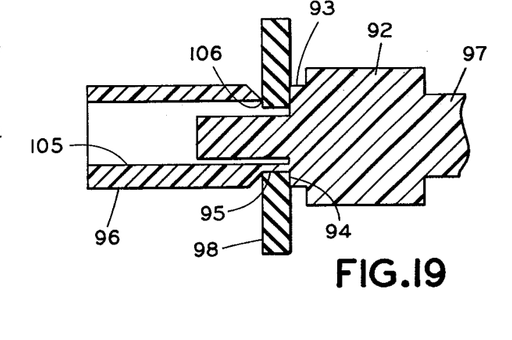
FIG. 19 is a fragmentary section on line 19—19.

As seen in FIGS. 18, 19, the stem 96 has a plurality of segment shaped lengthwise chambers 104, 104' and 104'' which reduce the wall thickness of the stem and provide longitudinal internal ribs 105. These chambers 104, etc. cut through the tapering portion formed by the neck 95 and thus provide ports 106 normally closed by the washer 98. When the stem 96 is pushed downwardly (to the right FIG. 17) the tapering neck will spread the opening in the washer 98 and thus expose the ports 106 to allow flow through passage 103 through the valve housing and out port 106 and stem 96. The guide body 92 has a loose fit in the stem housing to allow flow clearance, and may have flat portions to provide additional flow space.

Figure 16:
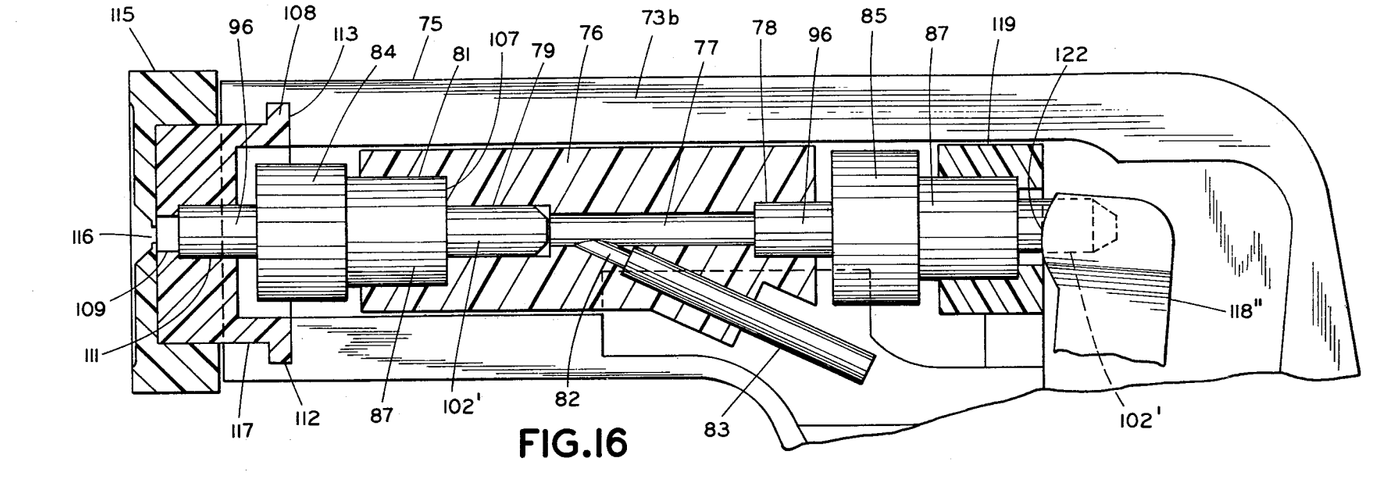
FIG. 16 is a vertical sectional view of the mixing and spraying mechanism of the spray gun.

Referring to FIG. 16, the stem housing 87 of the valve is received in counterbore 81 with a tight fit and engages the shoulder 107, and extension 102' is received in bore 79. An adapter 108 has a flow passage 109 therein and a counterbore 111 which receives the valve stem 96. The adapter has a flange 112 received in an annular chamber 113 in the gun housing so that it cannot move longitudinally. An orifice head 115 has a spray orifice 116 of suitable size and shape in alignment with flow passage 109, and the orifice head is removably received on the cylindrical outer surface 117 of the adapter 108.

Figure 17:
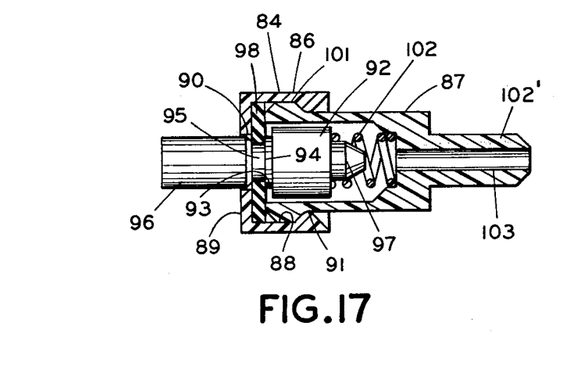
FIG. 17 is a vertical sectional view of a control valve.

From the structure so far explained it will be seen that when the mixing chamber 76 is bodily moved forward it moves the valve 84 forward, but valve stem 96 abuts the adapter 108 and cannot move. Thus, referring to FIG. 17, the valve cap 86 moves to the left relative to the valve stem to uncover ports 106 and provide a flow passageway through the valve. The air conduit 5 is connected into mixing chamber 77 through passage 82 so upon opening of valve 84 air can flow therethrough and through the passage 109 and spray orifice 116.

Figures 20, 21:
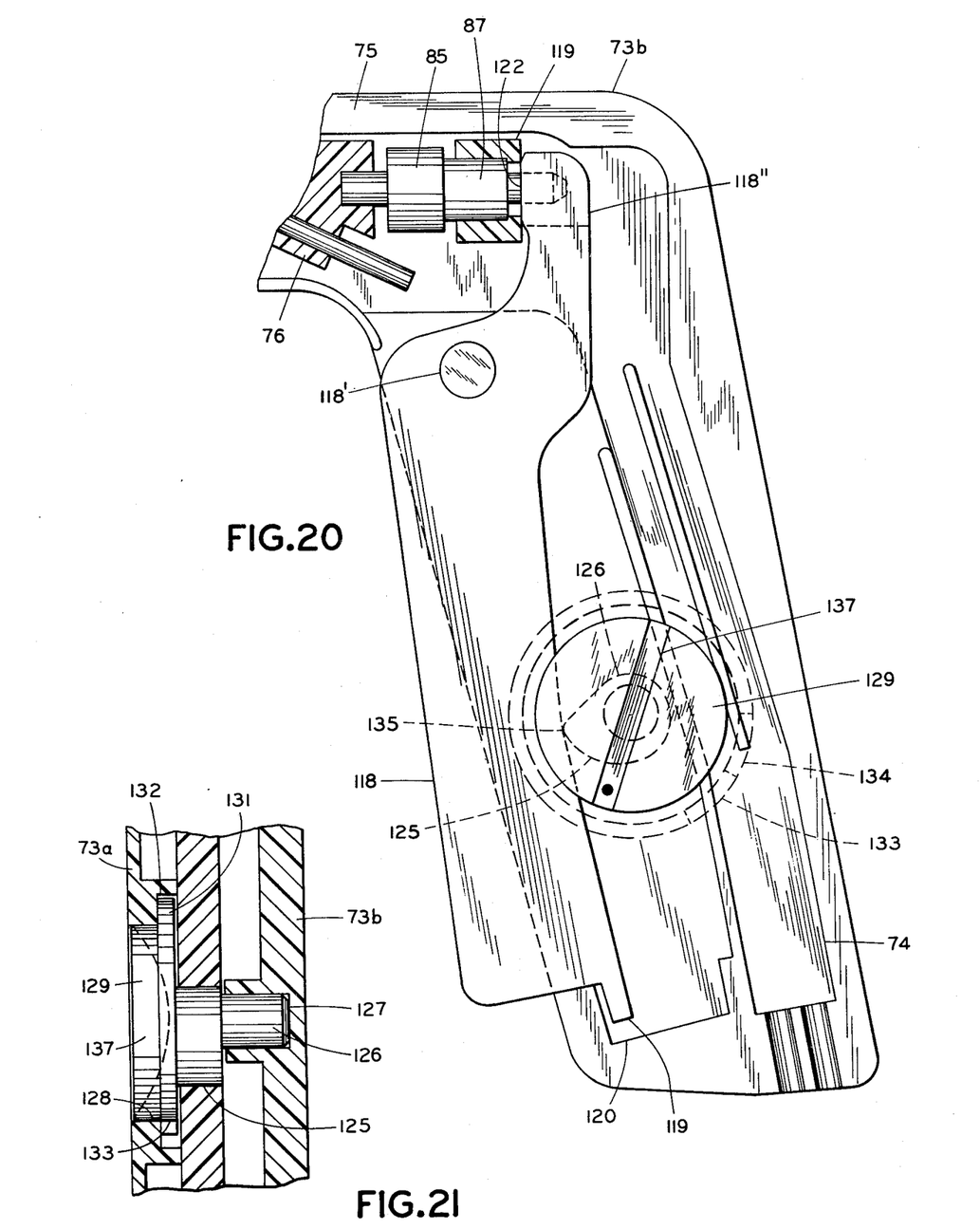
FIG. 20 is a cut away view of the air gun handle.
FIG. 21 is a partial section of the air gun handle.

The similar valve member 85 has its stem 96 received in the relieved portion 78 of the mixing chamber. This valve has a similar housing member 86 and stem housing member 87 and a stem housing extension 102'. An internally flanged collar 119 is received on the stem housing. Conduit 6 which carries liquid, connects with a friction fit on the extension 102' of the valve stem housing of rear valve 85 (FIG. 13). Referring to FIG. 20, the trigger 118 is mounted on a pivot 118'. At the bottom the trigger has an extension or finger 119 which moves in a recess 120 and thus limits the extremes of pivotal movement of the trigger. The upper end 118'' of the trigger has an opening therethrough to receive the rear valve stem housing extension 102' and its conduit 6, formed by bifurcating the upper end of the trigger. Face 122 bears on the collar 119 which in turn bears on the rear valve stem housing 87. When the trigger is grasped it causes the upper end 118'' to move to the left, thus moving the rear valve housing 85 to the left, and as rear valve stem 96 of valve 85 engages the mixing chamber 76, the mixing chamber is moved to the left. If the mixing chamber could not move, rear valve 85 would be opened and liquid could flow into mixing chamber 77. Because spring 102 of the forward valve 84 is weaker or softer than the corresponding spring of rear valve 85, and as chamber 76 floats between the bias of the valve springs, the chamber 76 is moved forward by valve stem 96 of valve 85. This movement of chamber 76 is transmitted to forward valve housing 87. Stem 96 of forward valve 84 abuts adapter 108, so that the forward valve 84 which has the weaker spring is opened to allow air flow therethrough. Rear valve 85 opens when the resistance force of the weaker forward valve spring becomes greater than the opening load of the rear spring. Thus, the opening of forward valve 84 allows air flow through the mixing chamber and spray orifice to insure proper atomizing air volume when the liquid starts to flow. In closing movement, the rear valve 85 closes first, thereby allowing the air flow to purge the mixing chamber and spray orifice of residual liquid.

Generally, the forward valve 84 will be nearly fully open before the rear valve 85 starts to open, so that the degree of movement thereafter of the trigger determines the rate of liquid flow. By means of an adjustable stop for the trigger the operator can adjust the gun for a desired ratio of liquid to air, and thereby deliver a heavy spray or various degrees of lighter sprays. This stop will now be described.

Referring to FIGS. 20 and 21 a cam disk 125 has a stub shaft 126 by which it is rotatably journalled in a socket 127 in the half handle 73*b* of the gun. The other half handle 73*a* has a circular aperture 128 which receives the operating knob 129 integral with the cam, and a flange 131 received in a socket 132 in the inner face of the half handle 73*a* retains the cam member in place. A boss 133 on flange 131 extends for 30° and co-operates with a lug 134 in socket 132 which also extends for 30° to provide a stop limiting rotation of the cam to 300°. The interior edge 135 of the trigger engages cam 125 as shown in FIG. 20, where the cam is in position with its radially outermost point engaging the trigger which thus limits the trigger to its minimum movement. In this position the setting may be such that operation of the gun yields a low proportion of liquid to air and results in a light spray, or if desired, the liquid may be shut off thus delivering only an air spray. The cam surface of cam 125 extends for about 300°, and by turning the cam to the opposite limit until boss 133 engages the other edge of lug 134 the trigger has its maximum movement and in this position operation of the gun yields a high proportion of liquid to air and results in a heavy spray. An intermediate spray is obtained by moving the cam to an intermediate position. It is preferred to have the cam surface slope so that the radial distance is proportional to the angle of rotation, but any desired cam slope may be provided, and the limits of cam rotation depend on the range of cam employed. To facilitate turning the cam, the face of knob 129 is concave and a diametrical bar 137 with an index dot thereon is provided.

The operation of the apparatus will now be described. As shown in FIG. 16, the reaction of the valve springs 102 in valves 84 and 85 biases the collar 119 to the right into engagement with the trigger end 118″ and the stop finger 119 (FIG. 20) at the lower end of the trigger limits movement of the lower end of the trigger to the left. Assuming the cam 125 is set for minimum trigger movement, when the trigger is operated by closing the hand grasping the gun handle, the upper end 118″ is moved to the left to push collar 119 to the left, and in turn the thrust of the collar is transmitted by the rear valve housing to move mixing chamber 76 to the left. In turn the mixing chamber, through engagement of shoulder 107 with valve stem housing 87, applies a thrust to this stem housing, but because the stem 96 cannot move the entire valve housing 86, 87 (FIG. 17) moves to the left thus deflecting the center portion of washer 98 to uncover valve ports 106 and allow flow of air through the forward valve from chamber 77. Usually forward valve 84 will be fully opened before its spring 102 developes enough resistance to compression to balance the corresponding spring of rear valve 85. When this balance point is exceeded, the mixing chamber will not move further to the left, and in effect acts as an abutment for rear valve stem 96 thus allowing movement of rear housing 87 to open the rear valve and allow flow of liquid therethrough into the mixing chamber 77. Thus a spray of liquid and air is charged through front valve 84 and spray orifice 116. If a greater proportion of liquid to air is desired, that is, a heavier spray, the cam knob 129 is turned clockwise as viewed in FIG. 20, to bring a portion of the cam having a shorter radius opposite trigger groove 135 thus allowing greater movement of the trigger to the right. This causes greater movement of the upper end 118″ of the trigger to the left to open rear valve 85 to a greater extend and allow greater liquid flow.

I claim:

1. In an air-liquid spray system, a replaceable reservoir, a housing for said reservoir having a hinged front cover, said hinge and cover being arranged to cause the bottom edge of the cover to swing under the housing in open position, a flexible air conduit from a source of compressed air passing into the housing and connected to the reservoir, an abutting member in the housing overlying the conduit, and a presser member under the conduit extending under the bottom of the housing and engaged by the front cover in open position to squeeze the conduit between the abutting member and presser member and stop air flow through the conduit.

2. An air-liquid spray system as specified in claim 1 wherein said reservoir comprises a flask having a neck, a plug in said neck having an air inlet socket, an outlet socket, and a liquid outlet socket, said latter socket having a tube extending to adjacent the bottom of the flask, and a removable adaptor head having a said flexible air conduit connected thereto and flexible air and liquid outlet connections connected thereto, and corresponding extensions removably received in said sockets, said adapter head and plug forming a sealed connection to said flask.

3. In an air-liquid spray system in which a replaceable reservoir, supplied with air through a conduit from a source of compressed air, is maintained within a housing comprising a main body and a cover, the improvement providing automatic shutoff of said air supply when said housing is opened which comprises said cover being hinged to said main body, said conduit comprising a flexible, compressible hose, and a pair of opposing projecting members on opposite sides of said hose, said members being capable of relative motion with respect to each other to close the distance between them and to pinch said hose between them to the point of closure when said hinged cover is opened.

4. The air-liquid spray system of claim 3 in which one of said opposing members is an abutting member fixed in position against one side of said hose and the other of said opposing projecting members is a presser member located on the opposite side of said hose and movable toward said abutting member.

5. The air-liquid spray system of claim 4 in which said cover is a front cover hinged to a lower portion of said main body.

6. The air-liquid spray system of claim 5 in which said main body is mounted on legs to provide a clearance space between the bottom of said body and a support surface therefor, and said front cover is hinged so that its bottom end pivots into said clearance space.

7. The air-liquid system of claim 6 in which said hose enters said main body through an opening in the lower portion thereof, said abutting member is a pin located within said housing and near said opening, and said presser member is a pin which is slidably mounted in said main body, one end of said last-named pin being in contact with said bottom end of said cover when said bottom end is in said clearance space, and the other end of said last-named pin being in contact with and compressing said hose when said bottom end of said cover is in said clearance space.

* * * * *